United States Patent [19]

Boosler, Jr. et al.

[11] Patent Number: 4,974,972
[45] Date of Patent: Dec. 4, 1990

[54] CROSSED ROLLER BEARING

[75] Inventors: Robert B. Boosler, Jr., Hacienda Heights; Thurman W. Jessup, Anaheim, both of Calif.

[73] Assignee: Lucas Western, Inc., City of Industry, Calif.

[21] Appl. No.: 456,950

[22] Filed: Dec. 26, 1989

[51] Int. Cl.⁵ .............................................. F16C 19/00
[52] U.S. Cl. ..................................... 384/447; 384/619
[58] Field of Search ................. 384/447, 619, 47, 580, 384/572

[56] References Cited

U.S. PATENT DOCUMENTS

| | | |
|---|---|---|
| 2,430,359 | 11/1947 | Messinger . |
| 2,607,641 | 8/1952 | Messinger . |
| 2,628,137 | 2/1953 | Ashton . |
| 2,734,786 | 2/1956 | McNicoll . |
| 3,275,931 | 9/1966 | Blais . |
| 3,361,501 | 1/1968 | Messinger et al. . |
| 3,517,975 | 6/1970 | Lonngren et al. . |
| 4,065,192 | 12/1977 | Sague . |
| 4,479,683 | 10/1984 | Kanamaru . |
| 4,606,654 | 8/1986 | Yatsu et al. . |
| 4,746,232 | 5/1988 | Gugel ................................... 384/619 |
| 4,755,065 | 7/1988 | Walter et al. ........................ 384/447 |

OTHER PUBLICATIONS

Timken Brochure, "The Timken Crossed Roller Bearing", (no date).
*Bearing Design,* "Two-Row Bearings", (1972).

*Primary Examiner*—Lenard A. Footland
*Attorney, Agent, or Firm*—Pretty, Schroeder, Brueggemann & Clark

[57] ABSTRACT

A cross roller bearing includes a slotted cage structure that separates and controls tapered rollers as they roll on the bearing races. The cage is a load-bearing structure that is in sliding contact with the larger diameter axial end surface of the rollers, thereby preventing any sliding contact between the bearing races and the axial ends of the rollers. The point of sliding contact between the cage and the rollers may be selected for minimizing friction.

14 Claims, 3 Drawing Sheets

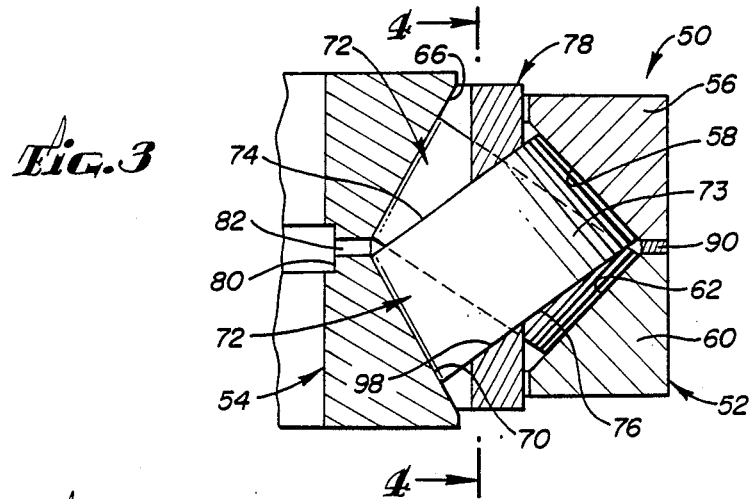
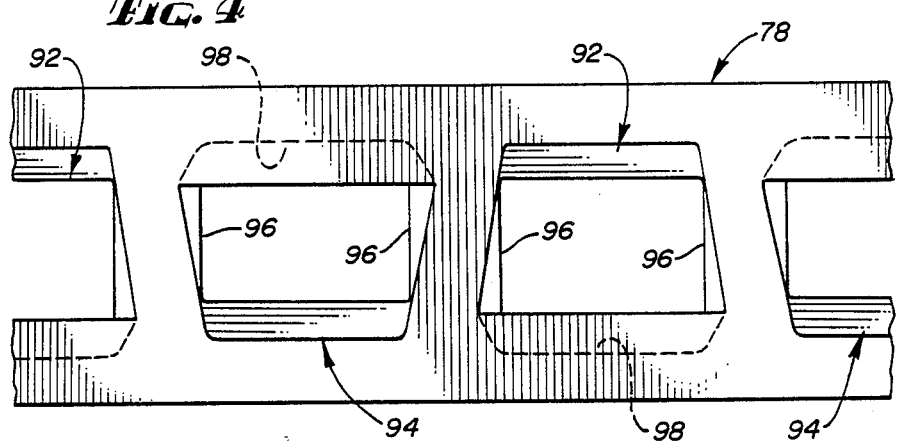
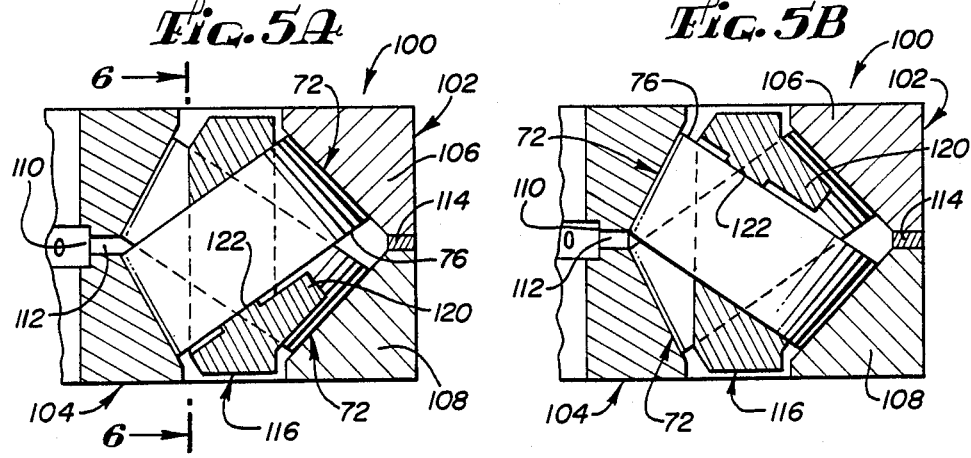

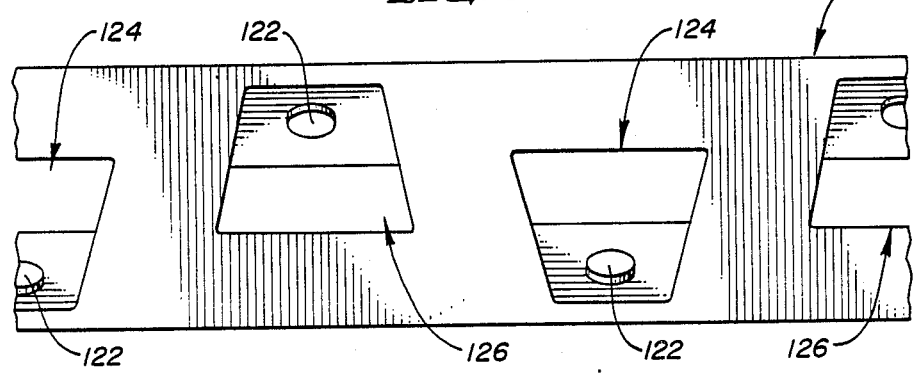
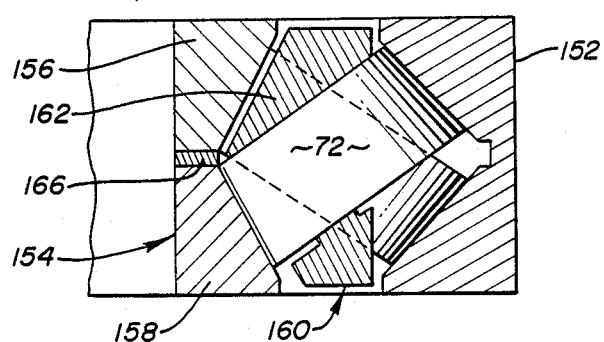

CROSSED ROLLER BEARING

BACKGROUND OF THE INVENTION

1. Field Of The Invention

This invention relates generally to crossed roller bearings, and more particularly to a low-friction crossed roller bearing with a load-bearing cage structure.

2. Description Of The Related Art

Crossed roller bearings reduce friction between two rotating bodies and can withstand axial, radial, and moment loads, providing the advantages of multiple row bearings in the space of a single row bearing. FIG. 1 shows a typical conventional crossed roller bearing 10 of a type shown, for example, in U.S. Pat. No. 2,628,137 to Ashton. The bearing comprises an outer ring 12 and an adjacent inner ring 14. The inner ring is split for easier assembly of the bearing and is comprised of a top half 16 and a bottom half 18. The adjacent, facing surfaces of the outer ring and inner ring are provided with V-shaped grooves whose surfaces define bearing races. The outer ring includes an upper race 20 and a lower race 22. The inner ring includes an upper race 24 and a lower race 26. The races define an annular space between the rings that is filled with a plurality of rollers 28.

The rollers 28 are of a tapered cylindrical shape, having axial end surfaces 30, 31 and conical longitudinal peripheral surfaces 32. The rollers are separated and kept rolling through low-load areas by a cage structure 34. Individual spacers in the shape of blocks or disks are also used, for example, as shown by U.S. Pat. No. 3,275,391 to Blais. The tapered shape of the rollers dictates that one outwardly facing axial end surface 30 has a larger diameter than the other end surface 31. The rollers are alternatingly inclined, or crossed. That is, the axial orientation of the rollers 28 alternates by approximately 90 degrees between adjacent rollers, as illustrated in FIG. 1. The bearing 10 reduces the friction between two rotating bodies through relative movement between the outer ring 12 and the inner ring 14. During this movement, the rollers will rotate about their longitudinal axes in the annular space between the rings. Bearing loads are reacted against the races by the rollers. Because the rollers are tapered, the loads from the races create a resultant force that tends to move the rollers outwardly in a direction perpendicular to the larger diameter axial end surface 30. This is referred to as end loading of the rollers.

When a roller belonging to one set of inclined rollers rotates, its peripheral surface 32 rolls along the upper, outer race 20 and lower inner race 26. The larger diameter axial end surface 30 of the roller is pressed against the other outer race 22 and is essentially dragged along the race surface. That is, the larger diameter axial end surface will be in sliding contact with the outer race as the roller rolls within the annular space. The alternately inclined set of rollers will have rolling contact with the opposite corresponding races 22 and 24, and will have sliding contact with the other outer race 20. Thus, the outwardly directed force from the rollers that results from bearing loads presses the large diameter axial end surface against the outer race.

The end loading and resultant sliding contact of the roller axial end surfaces on the races produces friction and limits the bearing speed. The friction also generates heat and increases the wear of the races. Because of the increased friction and wear, crossed roller bearings are typically limited to low speed applications on the order of 500 rpm or less. It is also generally more difficult to keep conventional crossed roller bearings lubricated when compared with other roller bearing designs, further dictating low speed applications. The problems of end loading have been recognized, but thus far efforts have only resulted in a reduction of the sliding contact with the races, rather than a complete elimination. See, for example, U.S. Pat. No. 3,361,501 to Messinger et al. and U.S. Pat. No. 4,746,232 to Gugel.

Thus, there is a need for a crossed roller bearing that can withstand axial, radial, and moment loads in a compact size, while eliminating sliding contact of the rollers with the races, and also providing reduced friction, high speed capability and enhanced lubrication. Such a bearing would combine the ability of a crossed roller bearing to take a variety of loads in a compact size with the high speed capability of conventional tapered roller bearings. Such a bearing would also have lower friction than conventional crossed roller bearings, resulting in increased bearing life, and would allow longer survival in the event of loss of lubrication.

SUMMARY OF THE INVENTION

The present invention provides a low-friction crossed roller bearing with a ca-e structure that supports the larger diameter axial end surfaces of the tapered rollers and prevents contact between the large axial end surfaces and the bearing races. In this way, the present invention provides a crossed roller bearing with reduced friction and reduced wear on the bearing races. The reduced friction allows the bearing to be used in higher speed applications than existing crossed roller bearings, possibly at higher speeds than single-row tapered roller bearings. The bearing also provides superior lubrication for high speed and extended life.

A bearing in accordance with the present invention includes a bearing cage that separates and controls the rollers, and supports their large diameter axial ends. There is no sliding contact between the rollers and any of the races. There is sliding contact between the large diameter axial end surfaces of the rollers and a reduced contact area of the cage. The bearing further includes two sets of oppositely inclined rollers that transmit opposed forces to the cage. In accordance with the present invention, the cage is a strong one-piece structure. Forces that are axially directed along the rollers are reacted by the cage, while radially directed forces on the roller are directed to the races via the roller peripheral surfaces. Different materials may be selected for construction of the cage so as to reduce friction and enhance lubrication.

In accordance with the present invention, forces directed outwardly from the large diameter roller axial end surface are borne by the roller cage at a contact area of the cage. The material selected for construction of the cage advantageously has superior load bearing qualities. For example, silver plated steel has been found to be an excellent material for cages. The cage is a slotted structure that fits into the annular space defined by the bearing races. The cage may be given a cross-sectional shape such that it extends into the annular space defined by the bearing races and in-between the rollers. This increases the mass of the cage, and therefore its load carrying capability. The contact area of the cage with the axial end surface of the rollers may be selected to provide the minimum amount of friction between the rollers and the traces for the projected rotational speed of the bearing.

The inner race of the bearing may be provided with a plurality of radial holes that provide a flow of lubricating fluid, such as oil. Centrifugal force of the spinning bearing will naturally drive the lubricating oil from the inner race, over the peripheral surface of the rollers, and to the outer race. In one arrangement, the outer ring is a two-piece ring. The space between the outer ring halves provides a convenient exit path for the lubricating oil. Alternatively, the outer race may also be provided with a plurality of radial slots to provide an exit path for the oil.

Other features and advantages of the present invention should become apparent from the following description of the preferred embodiments, which illustrate by way of example the principles of the invention.

BRIEF DESCRIPTION OF THE DRAWINGS

The invention will now be described with reference to the accompanying drawings, in which like reference numerals refer to like elements.

FIG. 3 is a cross-sectional view of the crossed roller bearing illustrated in FIG. 2.

FIG. 4 is a laid-out view of the roller cage illustrated in FIGS. 2 and 3.

FIG. 5 is a cross-sectional view of a second preferred embodiment of a crossed roller bearing in accordance with the present invention.

FIG. 6 is a laid-out view of the roller cage illustrated in FIG. 5.

FIG. 7 is a cross-sectional view of another preferred embodiment of the present invention.

DESCRIPTION OF THE PREFERRED EMBODIMENTS

The following descriptions are of the best presently contemplated modes of carrying out the present invention. The descriptions are made for the purpose of illustrating the general principles of the invention and are not to be taken in a limiting sense. The scope of the invention is best defined by the appended claims and equivalents thereof.

Figure 1:
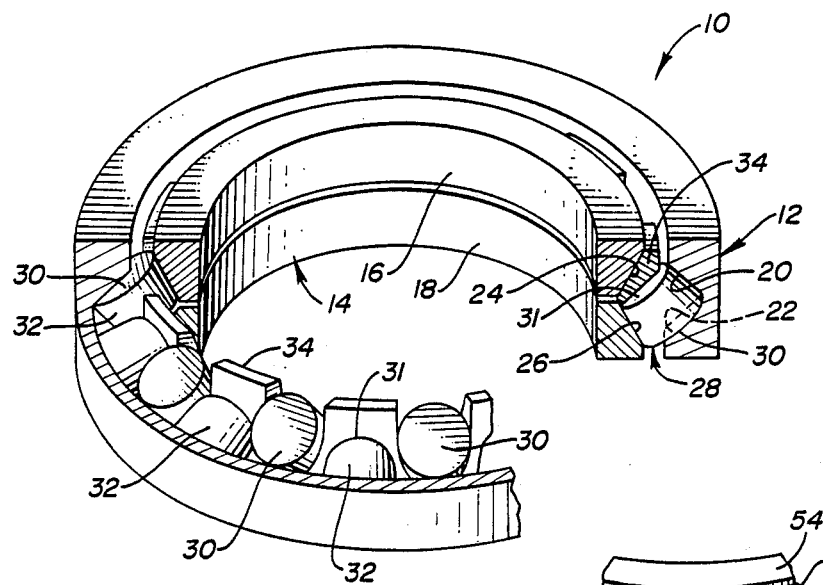
FIG. 1 is a cut-away perspective view of a conventional crossed roller bearing.
Figure 2A:
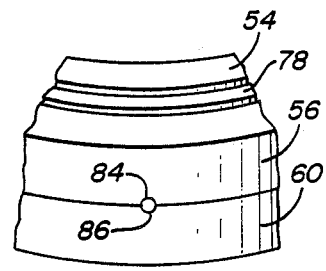
FIG. 2 is a cut-away perspective view of a first preferred embodiment of a crossed roller bearing in accordance with the present invention.
Figure 2:
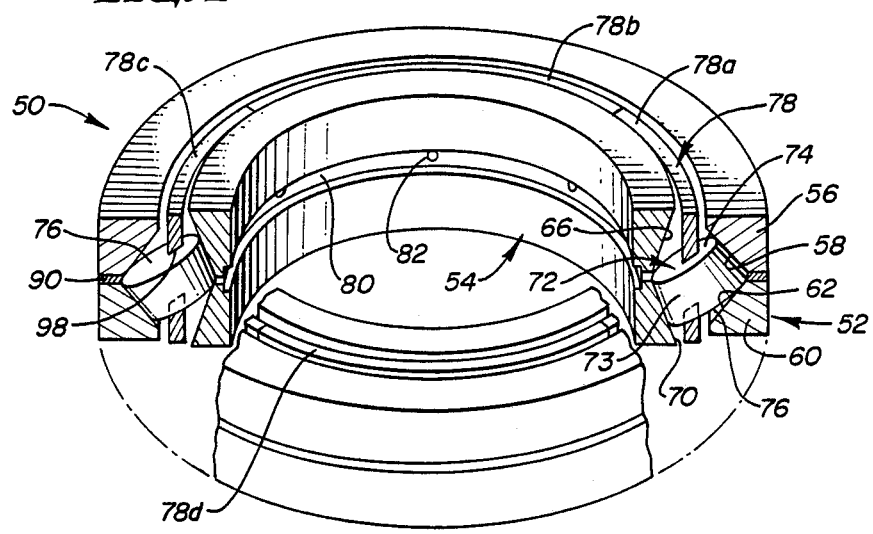

FIG. 2 shows a cut-away perspective view of a crossed roller bearing 50 in accordance with the present invention. The crossed roller bearing includes an outer ring 52 and an inner ring 54. The outer ring is constructed so as to be a split ring Thus, the outer ring comprises an upper portion 56 with an inclined surface defining a race 58 and a lower portion 60 with an inclined surface defining a race 62. The inner ring has an outer circumference with a V-shaped groove having an upper inclined surface defining a race 66 and a lower inclined surface defining a race 70. When the inner and outer rings are placed adjacent each other in a concentric fashion, the races define an annular space for rollers.

In the annular space between the races, a plurality of tapered roller bearings 72 are placed. Being tapered, the rollers have a smaller diameter axial end surface 74 and a larger diameter axial end surface 76. The rollers have a smooth peripheral surface 73, and rotate about their longitudinal axis. As with all tapered roller bearing designs, the roller peripheral surface forms a cone whose apex is located on the bearing axis of revolution. Loads on the bearing 50 are transmitted through the races to the rollers. As a result, forces acting on the rollers tend to push each roller outwardly along its longitudinal axis. The rollers are preferably alternatingly inclined with respect to each other. That is, each roller will be located between adjacent rollers whose axes of rotation are inclined with respect to its axis of rotation. The number of rollers inclined in one direction, however, may depend on the particular application and there may be an unequal number of rollers inclined in each direction. For example, if bearing loads are expected to come primarily from one axial direction, it may be preferable to have twice as many rollers inclined in one direction as in the other.

A slotted cage structure 78 is located between the outer ring 52 and inner ring 54 and extends into the annular space between the rings. The cage serves to separate and control the rollers 72, and bears the force directed outwardly from the large diameter axial ends 76. The cage may be constructed as a single piece, or may be formed in segments. In the illustrated embodiment, the cage is constructed of four segments 78a, 78b, 78c, and 78d.

The inside peripheral surface of the inner ring 54 is provided with a centrally located groove 80. The groove has a plurality of spaced apart radial holes 82. These holes provide a path for lubricating oil to enter the bearing and provide lubrication to the rollers. As the inner race rotates, centrifugal force tends to pull the lubricating oil between the annular space between the bearing races from the inner races 66, 70 toward the outer races 58, 62 Radial slots may be provided in the outer ring 52, providing an exit path for the lubricating oil. For example, slots 84, 86 may be provided on the edge of the outer ring halves 56 and 60, as illustrated in FIG. 2a. When the outer ring halves are assembled, the semi-circular slots 84, 86 provide an exit path for the lubricating oil.

A shim 90 in the form of a flat ring may be located between the upper and lower outer ring halves 56 and 60. In some applications, a shim will be unnecessary. Depending on the size of the be-ring and the application, it may be desirable to provide varying amounts of spacing between the upper and lower outer ring halves 56 and 60. This spacing may be provided by selecting a shim of suitable thickness, or by selecting several shims of suitable total thickness. The shim may alternatively be provided in the form of a split ring, a plurality of flat rings, or a plurality of curved segments that fit between the upper and lower outer ring halves 56, 60.

The roller bearing illustrated in FIG. 2 is shown in cross-section in FIG. 3. As noted, each of the rollers 72 is a tapered roller and, therefore, has a smaller diameter at one axial end surface 74 than at its other axial end surface 76. Axial, radial, and moment loads on the bearing 50 generate forces perpendicular to the races and directed to the rollers in the annular space between the inner and outer rings.

A view of a section of the cage 78, laid out flat, is shown in FIG. 4. The cage comprises a ring with a plurality of slots that are arranged into two sets. One set of slots 92 are configured for accepting rollers 72 inclined in one direction, while an alternate set of slots 94 are configured to accept rollers 72 inclined in another direction. Each one of the slots 92, 94 has four surfaces that are adjacent a roller 72 in the assembled bearing. Two side surfaces 96 of each slot are adjacent and in light contact with the peripheral surfaces 73 of the roller. A load bearing surface 98 of each slot is in sliding contact with the large diameter axial end surface 76 of each roller. The large diameter axial end surface of the roller presses against the load bearing surface of the cage, thereby distributing the bearing loads into the cage rather than against the races. The remaining side of the cage slot is only in light contact with the roller small diameter end surface 74.

The cage can be constructed from any high strength material, such as steel. The steel can be plated with silver for reduced friction, increased lubrication, and better heat conductivity. These qualities are especially important in high speed applications. Bronze alloys can also be used for the cage, as well as sintered steel impregnated with a lubrication agent. The impregnated lubrication agent is especially useful where the bearing may have to operate for a time with no lubricating oil. The particular application of the bearing will dictate the material used for the cage, as known to those skilled in the art.

In an alternate preferred embodiment of the present invention, shown in FIG. 5, a crossed roller bearing 100 includes an outer ring 102 and an inner ring 104, with FIG. 5A showing one roller and FIG. 5B showing an oppositely inclined roller. The outer ring is of a split design, having an upper portion 106 and a lower portion 108. The inner ring is a one piece design, with the sectional view showing a lubricating groove 110 and a lubricating radial hole 112. A shim 114 provides the needed separation between the upper and lower outer ring halves. These elements are similar to those described in the previous embodiment of FIGS. 2-4. The embodiment of FIG. 5, however, includes a cage structure 116 that is adapted to utilize as much of the annular space between the bearing rings as practical. Therefore, the cage includes a raised portion 12n that extends into the annular space between the rings toward the split outer ring 102. This added mass of material adds strength to the cage. There can be no similar extension of material into the opposite annular space because the inner ring is not split. During assembly of the bearing, the cage is slid into position past the inner ring and must clear the top of the inner ring. As with the previous embodiment, the reactive forces from the rollers are directed to the cage 116, with no sliding contact by the rollers with any of the races.

As shown in FIG. 5, the cage 116 is provided with a raised button 122, which has sliding contact with the large diameter axial end surface 76 of each roller 72. The button may be positioned such that sliding contact with the roller occurs at a predetermined spot 124 on the roller axial end surface. The predetermined spot can be selected to provide the minimum friction at the anticipated rotational speed of the bearing. The button may be selected to place the point of sliding contact with the roller axial end surface 76 anywhere from the axis of rotation to the outer edge of the axial end surface. If the point of contact is selected to be at the axis of rotation, the linear speed of the point of sliding contact with the cage will be very small. The greatest relative speed at the point of sliding contact will be where the button on the cage is located near the edge of the axial end surface. As known to those skilled in the art, the minimum lubricated friction occurs at a linear speed of approximately 10 feet per second. In the embodiment illustrated in FIG. 5, the button 122 is placed at a point where sliding contact with the roller 72 will be at the speed of lowest friction. For other applications, with differently sized bearings and different rotational speeds, the button 122 may have a location different from that shown in FIG. 5 for lowest friction. The placement of the button is well within the abilities of those skilled in the art, in view of this description. The button can be a raised portion of the cage or can be an insert pressed into a recess in the cage.

A section of the cage 116 laid flat is shown in FIG. 6. The cage is provided with a plurality of slots having an alternating configuration for the oppositely inclined rollers, one set of slots 124 being for one set of rollers and the alternate set of slots 126 being for the oppositely inclined rollers. Each slot includes a raised button 122 that provides the point of contact with each respective roller.

In yet another bearing 150 shown in FIG. 7, also in accordance with the present invention, the outer ring 152 is of a single-piece construction, while the inner ring 154 is of a split ring configuration, having an upper half 156 and a lower half 158. Thus, the arrangement of the rings is the reverse of that shown in FIG. 5. Which one of the rings is split depends on the particular application. The cage 160 is essentially that shown in the previous embodiment, considering that the bearing is always constructed such that the bearing loads reacting through the races always tend to force the tapered rollers outwardly. Therefore, the outer ring will always have the deeper groove, regardless of whether or not it is of split construction. To utilize as much of the annular space between the bearing rings as practical, the cage includes an extended portion 162 that extends into the annular space toward the inner ring 154. The added mass of material adds strength to the cage. There can be no similar extension into the opposite annular space because the outer ring is not split, and during assembly the cage must slide into position and clear the top of the outer ring. Again, a shim 166 may be used to provide proper spacing between the split ring inner halves.

The present invention has been described above in terms of several presently preferred embodiments so that an understanding of the present invention may be conveyed. There are, however, many configurations for bearings and cages not specifically described herein, but with which the present invention is applicable. The present invention should therefore not be seen as limited to the particular embodiment described herein, but rather, it should be understood that the present invention has wide applicability with respect to cages of different configurations and materials, and to bearings of a wide variety of sizes and functions. Such alternate configurations may be achieved by those skilled in the art in view of the descriptions herein.

We claim:

1. A crossed roller bearing comprising an inner ring having a V-shaped groove on its outer circumference defining bearing races; an outer ring having a V-shaped groove on its inner circumference defining bearing races, the bearing races defining an annular space between the rings; a plurality of tapered rollers having a large diameter axial end surface and a small diameter axial end surface joined by a peripheral longitudinal surface, the tapered rollers rotating in the annular space between the rings in rolling contact with the races such that bearing loads are reacted through the bearing races to the rollers, thereby exerting a force on the rollers that is directed outwardly toward the large axial end surface of the rollers; and a cage for separating and controlling the rollers, the cage having a plurality of slots, each slot having a support surface that has sliding contact with the large diameter axial end surface of the roller, thereby resisting the outwardly directed roller force.

2. A crossed roller bearing as recited in claim 1, wherein the cage comprises a flat ring and the slots are configured to slidingly accept individual rollers.

3. A crossed roller bearing as recited in claim 2, wherein the flat ring further includes a raised ridge that extends into the annular space between the rings and between the rollers.

4. A crossed roller bearing as recited in claim 1, wherein the point of sliding contact with the axial end surface of a roller is selected to have minimal friction.

5. A crossed roller bearing as recited in claim 1, wherein the point of sliding contact on the cage is a raised button.

6. A crossed roller bearing as recited in claim 1, wherein the outer ring is of a two piece construction.

7. A crossed roller bearing as recited in claim 6, wherein a flat, circular shim is placed between the split portions of the outer ring.

8. A crossed roller bearing as recited in claim 6, wherein the cage includes a raised portion that extends into the annular space between the two portions of the outer ring.

9. A crossed roller bearing as recited in claim 6, wherein the outer ring portions include radial slots that allow lubricant to exit from the bearing.

10. A crossed roller bearing as recited in claim 1, wherein the inner ring is of a two piece construction.

11. A crossed roller bearing comprising:
a plurality of tapered rollers, each roller having a large diameter axial end surface and a small diameter axial end surface with peripheral surface joining the two end surfaces;
an inner ring with roller races on its outer circumferential surface for rolling movement of the roller peripheral surfaces thereon;
an outer ring roller races on its inner circumferential surface for rolling movement of the roller peripheral surfaces thereon, the outer ring having a diameter greater than that of the inner ring such that, when the inner ring is placed concentrically within the outer ring, the races define an annular space in which the rollers may roll; and
a slotted cage for separating the rollers, each slot of the cage having a surface for supporting the large diameter axial end surface of a tapered roller.

12. A crossed roller bearing as recited in claim 11, wherein the slotted cage comprises a flat ring and each slot comprises a generally trapezoidal opening in the ring such that one of the rollers may be slidingly inserted into the slot.

13. A crossed roller bearing as recited in claim 11, wherein the surface for supporting the large diameter axial end surface of a roller comprises a raised button extending into the slot.

14. A crossed roller bearing as recited in claim 13, wherein the raised button is located such that the linear speed of the sliding contact with the roller results in minimum friction.

* * * * *

UNITED STATES PATENT AND TRADEMARK OFFICE
CERTIFICATE OF CORRECTION

PATENT NO. : 4,974,972

DATED : 12/4/90

INVENTOR(S) : Robert B. Bossler, Jr. & Thurman W. Jessup

It is certified that error appears in the above-identified patent and that said Letters Patent is hereby corrected as shown below:

On the title page:
Change the first inventor's name from "Robert B. Boosler, Jr." to --Robert B. Bossler, Jr.--.

At column 2, line 27, delete "ca-e" and insert therefor --cage--.

In column 3, line 2, delete "traces" and insert therefor --races--.

At column 4, line 35, insert --.-- following "62".

At column 4, line 45, delete "be-ring" and insert therefor --bearing--.

At column 5, line 39, delete "12n" and insert therefor --120--.

At column 8:
In claim 11, line 11, insert --with-- following "outer ring".

Signed and Sealed this

Seventeenth Day of November, 1992

*Attest:*

DOUGLAS B. COMER

*Attesting Officer*   Acting Commissioner of Patents and Trademarks